Patented Nov. 17, 1953

2,659,758

UNITED STATES PATENT OFFICE 2,659,758

MAINTAINING ACTIVITY OF CUPROUS OXIDE CATALYST IN OXIDATION OF OLEFINS

Kenneth D. Detling, Berkeley, and Thurston Skei, Lafayette, Calif., assignors to Shell Development Company, San Francisco, Calif., a corporation of Delaware No Drawing. Application June 28, 1948, Serial No. 35,744

11 Claims. (Cl. 260—604)

1

This invention relates to processes for partial oxidation of organic compounds in the gaseous state in the presence of a solid catalyst, and to improvements in the same. More particularly, the invention relates to a method for effecting the partial oxidation of organic compounds in the gas phase in the presence of a solid catalyst essentially comprising cuprous oxide, and to a method for maintaining and/or restoring high activity of the catalyst during the execution of such processes. Still more particularly, the invention pertains to a method for reactivating a catalyst essentially comprising cuprous oxide, which catalyst may have deteriorated in activity as a result of use under conditions in the processes of the character to which the invention relates, such that loss in catalyst activity has been incurred.

The invention is limited to those processes in which a gaseous mixture comprising an oxidizable organic compound, for example, a hydrocarbon or an oxygenated hydrocarbon, and an oxygen-containing gas, e. g., air, oxygen, oxygen-enriched air, etc., is contacted with a solid catalyst essentially comprising cuprous oxide under conditions which favor the desired oxidation of the organic compound. The process ordinarily will be executed with the catalyst in the form of a fixed bed, that is, immobile in bulk, positioned in a suitable reactor or reactors, and a continuous stream of the gaseous mixture will be passed into contact with the catalyst bed, the gaseous effluent from the reactor containing the desired product. In other cases, the catalyst may be in a mobile, or fluidized form in a reactor, and a portion of the catalyst may be carried along with the effluent from the reactor, to be subsequently returned. In still other cases, the catalyst may be in the form of a mobile, or pseudo-liquid, or fluidized bed of finely-divided solid catalyst, but permanently held in a reaction zone. Instead of finely-divided catalyst carried along in part by the gaseous effluent from the reaction zone, there also may be used at times mobile catalyst beds from and to which catalyst is continuously withdrawn and added, respectively, by suitable mechanical means. The principles of the invention are applicable in all instances. In certain cases, particular advantages of the method of the invention are realized with the immobile, or fixed bed type of catalyst. In other instances, which will be referred to hereinbelow, particular advantages of the method of the invention are gained when there is employed a catalyst system in which a continuous stream of the gaseous reaction mixture is passed into contact with a mobile (a moving, or a fluidized) bed of the catalyst to which active catalyst is continuously added and from which a portion of the catalyst is continuously withdrawn for reactivation.

The present invention is not concerned with the type of catalyst treatment known as catalyst regeneration, which treatment involves the removal, as by burning off or washing, or by decomposing with steam, of carbonaceous, tarry, or like materials deposited on the surface of a catalyst or in the pores of a catalyst. Such practices are well-known, particularly in processes such as catalytic cracking, polymerization, etc., applied to hydrocarbons or hydrocarbon mixtures. The formation of deposits on or in the cuprous oxide oxidation catalyst generally does not cause a serious problem in the processes with which the present invention is concerned because of the negligible extent to which it occurs. However, if such deposits are formed on or in the oxidation catalyst they may be removed by known procedures as required, generally at quite infrequent intervals, independently of the practice of the method of the present invention.

The present invention is directed to a treatment designed to overcome or to prevent deterioration in catalyst activity from less tangible causes than mechanical obstruction of the catalyst by deposits thereon or therein. In the processes to which the invention relates there may be observed over prolonged periods of operation a gradual and progressive decline in the activity of the cuprous oxide catalyst for promoting the desired reaction. The decline may be qualitative—that is, the selectivity of the catalyst may be reduced, with the result that the amount of the organic material converted to the desired product becomes less and the relative proportion of undesired by-products increases—or the decline may be quantitative in the sense that the catalyst simply becomes less active for promoting oxidation reactions, with or without change in selectivity. In the latter case, the amount of the feed material oxidized decreases, while in the former case it is the yield of desired product based upon the amount of the feed consumed that decreases. In many cases the decrease in activity may be accompanied by little or no change in the outward appearance of the catalyst.

While it is not desired to limit the invention according to any theory, it appears possible that these changes in activity of the cuprous oxide catalyst may be due, at least in part, to qualitative and/or quantitative changes in adsorption sites on the surface of the catalyst. It is generally recognized that heterogeneous catalysis by a solid catalyst is a surface phenomenon in which adsorption of reactants and reaction products at adsorptive sites on the catalyst plays an important role. A qualitative change, chemical or physical, in the character of the adsorption sites could lead to a corresponding change in the activity of the catalyst. Such changes in the adsorptive sites may occur even though the cuprous oxide catalyst, viewed in bulk, would appear unchanged. On the other hand, a reduction in the number of active sites, as by the adsorption on the catalyst of a component normally present in the gaseous reaction mixture (for example, a product of side reaction, or an impurity in the gaseous feed) could lead to a marked decrease in the overall activity of the catalyst. Since under normal operating conditions of a continuous process, all components of the reaction mixture ordinarily are present in relatively constant amounts, each tends to be adsorbed by the catalyst until equilibrium is reached. Changes in the character of the adsorptive sites, even though slight, may result in preferential adsorption of a species not involved in the mechanism of the oxidation, with consequent "blocking" of such sites from playing a useful role on the catalyst surface.

The oxidation of the organic compound in the presence of the cuprous oxide catalyst to produce the desired product is effected under controlled or selected conditions of temperature and pressure. The oxidation ordinarily will be effected at an elevated temperature. The temperature within the reactor generally is within the range of from about 150° C. to about 650° C. However, higher temperatures may be employed in some cases, provided excessive decomposition of the organic reactant and/or the desired product does not result. In other cases, maximum temperatures lower than 600° C. are desirable, say 450° C. as a maximum. Temperatures of from about 300° C. to about 500° C. frequently are employed. The gaseous mixture contacted with the catalyst may be under substantially atmospheric pressure, or it may be under a pressure above or below the atmospheric pressure. Superatmospheric pressures frequently may be employed, ranging upward to several atmospheres of pressure; however, excessively high pressures, e. g., pressures above about 20 atmospheres usually will be avoided because it is desired to maintain the organic reactant in the vapor state. Pressures of from 4 to 15 atmospheres are particularly desirable in certain instances. For reasons which will be apparent hereinbefore and hereinafter, the method of the invention is particularly advantageous in certain of its aspects when employed in conjunction with oxidation processes effected at such moderately elevated pressures.

The present invention is based upon the discovery that the cuprous oxide catalyst in oxidation processes of the hereinbefore and hereinafter determined character, may be maintained at a high level of activity under conditions of operation conducive to its deactivation, or, if partially or wholly deactivated, may be restored to a high level of activity, by periodically and temporarily changing the operating conditions of the reaction (reactor) temperature and/or the pressure of the gaseous mixture contacted with the catalyst in such a direction that the ratio of the temperature to the pressure, taken in any arbitrarily selected units, is substantially increased, and then restoring the conditions existing before such change. In certain cases, it is desirable to operate the oxidation process with constant composition of the feed that is supplied to the cuprous oxide catalyst. For example, in certain cyclic operations part or all of the product stream issuing from the reactor is collected and, before or after separation of the desired reaction product, unreacted or excess organic reactant is recovered and recycled through the reactor with fresh feed. The complexity of the equipment and steps required for treating the product stream may vary, and in many cases they may be quite complex. In such cyclic operations, substantial change in the composition of the reactor effluent often would be undesirable because it would entail extensive adjustment in the operation of the recovery equipment at each change in order to compensate therefor. One of the advantages of the method of the present invention is that no substantial change in the composition of the mixture supplied to the cuprous oxide catalyst is involved, and no change is required. Changes in the composition of the reactor effluent during the reactivation treatment are minimized and generally avoided. Since the temporary increase in the ratio of the temperature to the pressure does not necessarily entail conditions at which the oxidation reaction no longer occurs, the formation of the desired product may be uninterrupted. This is a feature which is of distinct value in that it enables continuous product recovery without providing special equipment to compensate for intermittent output of reaction product from the reactor.

In accordance with the method of the present invention, high catalyst activity at a substantially constant overall level may be maintained in the catalytic oxidation of organic compounds over catalysts essentially comprising cuprous oxide by periodically for brief intervals substantially increasing the temperature of the catalyst bed and/or reducing the pressure of the gaseous mixture in contact with the catalyst while maintaining the conditions otherwise substantially unchanged. After a brief period of operation at the newly established conditions of temperature and/or pressure, the conditions of temperature and pressure existing before the change was effected, or other conditions of temperaure and pressure suitable for the process, may be restored.

The method of the invention is of particular advantage in the catalytic oxidation of hydrocarbons, e. g., olefins, to form oxygenated hydrocarbons, e. g., aldehydes, ketones, etc. The method of the invention may be illustrated specifically by its application in the catalytic oxidation in the presence of a cuprous oxide catalyst of olefins containing at least three carbon atoms to form unsaturated carbonylic compounds of the group consisting of the unsaturated aldehydes and the unsaturated ketones; for example, the catalytic oxidation of propylene in the presence of cuprous oxide to form acrolein, like oxidation of isobutylene to methacrolein, the straight chain butylenes to methyl vinyl ketone, etc. The process is that described in the copending application, Serial No. 776,616, filed September 27, 1947, now U. S. Patent 2,451,485. According to the process therein disclosed, a gaseous mixture comprising an olefin containing at least three carbon atoms and oxygen is passed into contact with a catalyst essentially comprising cuprous oxide, generally at a temperature within the range of about 150° C. to about 600° C., and the unsaturated carbonylic compound is recovered from the resultant gaseous mixture. The catalyst may be cuprous oxide alone, or it may be cuprous oxide supported on a carrier material, for example, pumice, silicon carbide porous aggregates, diatomaceous earth, etc. The oxygen may be used in the form of pure oxygen, air, or like oxygen-containing gas. The gaseous mixture may comprise, in addition to the olefin and the oxygen, an inert gas such as steam, nitrogen, carbon dioxide, etc. The following conditions are described in the aforesaid copending application as advantageous, but not limiting, for the oxidation of propylene to form acrolein:

| | |
|---|---|
| Oxygen concentration in reaction mixture prior to contact with the catalyst, volume per cent | 1 to 12. |
| Mole ratio, propylene to oxygen | 2:1 to 30:1. |
| Balance of feed | Steam and/or inert cases, such as $N_2$, $CO_2$, propane, etc. |
| Apparent contact time, seconds | 0.001 to 15. |
| Temperature, °C. | 250 to 600. |
| Pressure, atmospheres | 1 to 15. |

In this particular process, it is found that only under certain operating conditions does undesirable deactivation of the catalyst occur. However, since for reasons of plant design, etc., it may be desired to operate within ranges including such conditions, the method of the present invention provides an efficient and desirable means for overcoming such deactivation.

According to one embodiment of the present invention, the activity of the cuprous oxide catalyst in the above-described method for the oxidation of olefins containing at least three carbon atoms may be maintained at or restored to a high level of activity under conditions which favor catalyst deactivation, by periodically and for brief intervals of time decreasing the pressure of the gaseous reaction mixture in contact with the catalyst, and then raising the pressure to its initial level. When the oxidation is effected at a superatmospheric pressure, say at a pressure of 3 to 10 atmospheres, and the cuprous oxide catalyst becomes partially deactivated, the pressure may be reduced for a short period of time to substantially atmospheric pressure, without otherwise altering the reaction conditions, and then restored to its initial, higher value. It is found that following the brief period of operation at the reduced pressure, the activity of the cuprous oxide catalyst is restored from the level of partial deactivation to a level substantially that of a fully active catalyst. Instead of reducing the pressure to the atmospheric pressure, the pressure may be reduced from a higher level to a lower level that may be either above or below the atmospheric pressure; however reduction to pressures below atmospheric pressures generally is less desirable because of the necessity of applying a vacuum, or suction to the reaction system and, hence, for providing a system capable of operating successively under both superatmospheric and subatmopsheric pressures.

The magnitude of the reduction in the pressure required to effect the desired reactivation, or to prevent excessive deactivation, depends upon the operating conditions that are employed, the frequency of the reactivation treatment, the particular reactant that is being oxidized, and the extent or rate of deactivation of the catalyst under the operating conditions. In some cases, instead of reducing the pressure from, say, an operating pressure of 4 to 15 atmospheres to atmospheric pressure, the pressure may be briefly reduced by a smaller amount, for example, to 2, or even to 3 atmospheres. In a process operating at, for example, 15 atmospheres pressure, a brief reduction in the pressure to 7 or 8 atmospheres, more or less, may be employed. On the other hand, in a process operating normally at about atmospheric pressure, the pressure may be reduced to a suitable subatmospheric pressure, although this is not a preferred embodiment of the invention.

In a specific illustration of the invention, a stream of a gaseous mixture of propylene, air, and steam was passed into contact with a catalyst composed of cuprous oxide supported on silicon carbide porous aggregates positioned in a reaction tube surrounded by a liquid heat-transfer medium for regulation of the temperature. A reaction temperature, measured by means of thermocouples placed in the reactor tube, of about 375° C. to 400° C. was employed. The operating pressure was about 60 pounds per square inch (absolute). Effluent from the catalyst zone was collected periodically and analyzed to determine the proportion of oxygen fed that had been consumed, this being a convenient measure of the activity of the catalyst for the oxidation of the propylene to acrolein. At the start of the experiment, the activity of the catalyst was such that 93% of the oxygen fed was consumed, acrolein being produced in good yield. During the run, the activity of the catalyst gradually decreased until after 35 hours continuous operation only 69% of the oxygen fed was consumed. At this time, the pressure was released to atmospheric pressure without changing the composition of the feed or the temperature. After 5 minutes operation at atmospheric pressure, the original operating pressure was restored and a sample of effluent from the reactor then collected for analysis. It was found that 86% of the oxygen fed was consumed, indicating that pronounced reactivation of the catalyst was obtained by the brief period of operation at the reduced pressure.

In accordance with a further embodiment of the invention, the activity of the cuprous oxide catalyst may be maintained at and/or restored to a high level, by periodically increasing the reaction temperature, that is, the temperature of the catalyst, for a brief period of time, and then restoring the temperature to its initial value or other suitable operating temperature. Such increase in the temperature may be accomplished with or without change in the pressure, provided an appreciable and substantial increase in the ratio of the temperature to the pressure results. It generally is most convenient to increase the catalyst temperature without materially changing the pressure of the applied gaseous reaction mixture. It has been observed that when operating at a selected temperature within the ranges referred to hereinbefore, a brief and temporary increase of about 50° C. or more in the catalyst temperature has a definite beneficial action upon the activity of the catalyst determined after restoration of the temperature to its initial value.

In a process employing, for example, a catalyst temperature of about 350° C., the temperature of the catalyst may be increased periodically and for brief intervals to about 400° C. or more, say to 500° C., as a convenient maximum. Substantially greater over-all activity of the catalyst is obtained than if the temperature has been allowed to remain unchanged. The activity of the catalyst, if decreased between the periods of operation at the more elevated temperature, is restored to substantially its initial level by each period of operation at the higher temperature.

Ordinarily, the temperature need not be increased to a value above the range in which the desired partial oxidation of the organic reactant occurs; however, increases of a greater magnitude are not necessarily precluded.

It appears that in the general case, the magnitude of the periodic, temporary change in the operating pressure and/or temperature may be conveniently measured in terms of the value of the empirical ratio $$(T_1/T_0)^3/(P_1/P_0)^{1/3}$$

In this ratio, $T_0$ and $T_1$ are, respectively, the operating temperature, and the temperature of the catalyst during the reactivation treatment, both expressed in degrees centigrade. If the pressure only is changed, $T_0$ will of course equal $T_1$, and the fraction $T_1/T_0$ will have the value of unity. $P_0$ and $P_1$ are, respectively, the operating pressure and the pressure during the reactivation treatment, both expressed in pounds per square inch, absolute. When only the temperature is changed, $P_0/P_1$ similarly will equal 1.0. The magnitude of the change (i. e., the increase in temperature and/or decrease in pressure) desirably is such that the foregoing ratio has a value greater than 1.1. The ratio may have a value as great as 4.0. In preferred cases, the value of the ratio is between 1.2 and 2.5.

The required frequency of the reactivation treatment is determined, at least in part, by the rate at which the cuprous oxide catalyst tends to become deactivated. In some processes, it may be desirable to reactivate the catalyst as frequently as every hour or two, while in other cases reactivation at only quite infrequent intervals may be required, say, after every hundred or more hours operation. The necessary frequency of reactivation may be determined by continuously or periodically estimating the activity of the cuprous oxide catalyst, and reactivating according to the method of the invention only when necessary. Samples of the effluent from the reaction zone may be withdrawn and analyzed to determine the content of a component, such as the desired product, the oxygen, etc., and the reactivation treatment given only when it appears from such analyses to be required, or when the activity of the catalyst has decreased to a predetermined level. In other cases, the reactivation treatment may be given by periodically and at regular predetermined intervals increasing the catalyst temperature and/or reducing the pressure of the gaseous mixture in contact therewith, as hereinbefore explained, and then restoring the original conditions. Ordinarily, the period of operation under the conditions of increased temperature and/or reduced pressure need not be over about one hour. In many cases, reactivation periods of from two to three minutes to one-half hour suffice. Under otherwise similar conditions, the shorter the interval between the reactivation treatments, the shorter the reactivation periods that generally may be used.

The means that are employed for effecting the increase in the catalyst temperature and/or the reduction in the pressure depend upon the particular type of apparatus that is used and may be supplied by those skilled in the art. For example, in systems operating under a superatmospheric pressure in the reaction zone, a suitable valved outlet may be provided whereby the pressure within the reaction zone periodically may be blown down to atmospheric pressure, suitable controls on the feed lines being provided if required to prevent excessive rise in the flow rate of the reaction mixture. The mixture passed through the reaction zone during the period of operation at the reduced pressure may be passed, directly or indirectly, to the system in which the desired product is recovered and/or purified since it ordinarily will contain appreciable amounts of the desired product. The temperature of the catalyst bed may be increased by supplying more heat thereto by heaters or the like. In other cases, the preheat, if any, of the feed to the reactor may be increased to obtain the desired increase in the catalyst temperature. Less desirably, since it usually entails decreased output of the desired product, the catalyst temperature may be raised by increasing the amount of oxygen in the feed relative to the organic compound undergoing oxidation, thereby increasing the formation of carbon dioxide and, hence, the amount of generated heat of reaction.

According to one embodiment of the invention, the reactivation of the cuprous oxide catalyst may be accomplished in situ in the reactor employed for the oxidation of the oxidizable organic compound, by periodically changing the temperature and pressure therein as hereinbefore described and then restoring the initial conditions. Reactivation in situ is particularly adapted to operations with fixed beds of the cuprous oxide catalyst. According to another embodiment of the invention, a portion of the cuprous oxide catalyst may be transferred, intermittently or continuously, from the reactor to a second zone, wherein the reactivation is accomplished, and, after the reactivation, returned to the reactor. Moving beds of catalyst, transferred from one zone to the other by mechanical conveyors or the like, may be employed. There also may be used fluidized, or dense, pseudo-liquid beds of catalyst in the form of a dust or the like. A portion of the catalyst may be carried out of the reactor entrained in the gaseous reactor effluent, collected, passed as by gravity flow to the reactivation zone, and then returned, after the reactivation has been accomplished, in a similar manner to the reactor. Downflow systems, wherein the finely divided catalyst flows by gravity from the lower end of the reactor, also may be used. The circulation of the catalyst through the two zones preferably is continuous.

According to the invention, the catalyst is exposed in the reactivation zone to a separate portion, a stream, of the same reaction mixture that is passed into contact with the catalyst in the principal, or primary reactor. Reactivation of the catalyst is accomplished by maintaining the secondary reactor, or the reactivation zone, at a higher temperature and/or a lower pressure than in the principal reactor. The primary reactor generally contains the major portion of the catalyst, e. g., 75% or more of the total amount, and the major portion of the reaction mixture also passes through the primary reactor. In other words, the design of the two zones, or reactors, is such that the catalyst resides in the principal reactor for the major portion of the operating time, e. g., 75% to 95% thereof, and only a minor portion of the operating time in the reactivation zone. In each specific case, the exact relative size of the two reactors is determined by the required frequency of reactivation, the extent of deactivation, and the particular conditions that are to exist in each zone; the optimum design can be readily determined on the basis of suitable preliminary experiments.

In the oxidation of olefins containing at least three carbon atoms to unsaturated aldehydes and ketones, for example, the oxidation of propylene over a cuprous oxide catalyst to form acrolein, reaction conditions which may be optimum from the standpoint of plant design, product recovery, and recycle operations, may result in gradual deactivation of the catalyst. The present invention makes it possible to continuously operate the primary reactor at such optimum conditions and to overcome, or prevent, without the necessity for changing the composition of the reactor feed, the deactivating effect any conditions may have upon the catalyst. The cuprous oxide catalyst may be continuously withdrawn from the primary reactor, passed to the secondary reactor which is operated, for example, at a lower pressure than the primary reactor. Upon brief exposure of the catalyst in the reactivation zone to the gaseous reaction mixture at the reduced pressure, the activity of the catalyst is restored, and the reactivated catalyst is returned to the primary reactor. Since both zones may be maintained at conditions suitable for the desired oxidation, the gaseous mixtures leaving both reactors may be combined and the desired product recovered therefrom.

While reference has been made to certain details and embodiments of the invention, it will be apparent to those skilled in the art that various modifications and changes may be made therein without departing from the principles of the invention or from the scope of the hereto appended claims.

We claim as our invention:

1. A continuous process of oxidizing an olefin containing at least three carbon atoms to a product of partial oxidation by reaction with molecular oxygen in the presence of a solid catalyst essentially comprising cuprous oxide, comprising passing a gaseous mixture comprising said olefin and molecular oxygen into contact with the catalyst at a predetermined pressure, temperature, and composition of the gaseous mixture, whereby the olefin is oxidized to a product of partial oxidation, the conditions of operation being conducive to deactivation of the cuprous oxide catalyst, separating from the catalyst a gaseous mixture comprising the product of partial oxidation, when appreciable deactivation of the catalyst has occurred, and the catalyst is still free of material deposits of carbonaceous, tarry and like material, deliberately decreasing the pressure upon the gaseous mixture passed into contact with the at least appreciably deactivated catalyst while maintaining the conditions including the temperature and the composition of the said gaseous mixture comprising oxygen and olefin which is brought into contact with the catalyst otherwise substantially unchanged, the decrease in pressure being such that the ratio $$(T_1/T_0)^2/(P_1/P_0)^{1/3}$$

has a value of 1.1 to 4.0 when there is substituted for $T_0$ and for $P_0$ the temperature in degrees centigrade and the pressure in pounds per square inch absolute, respectively, at said predetermined operating conditions and for $T_1$ and $P_1$ the temperature in degrees centigrade and the pressure in pounds per square inch absolute, respectively, for said second-mentioned operating conditions, respectively, and after each period of operation at said lower pressure deliberately restoring the pressure upon the gaseous mixture passed into contact with the catalyst substantially to the pressure obtaining in the interval prior to the decrease.

2. A process according to claim 1 when the olefin is propylene and the product of partial oxidation thereof is acrolein.

3. A continuous process of oxidizing an olefin containing at least three carbon atoms to a product of partial oxidation by reaction with molecular oxygen in the presence of a solid catalyst essentially comprising cuprous oxide, comprising passing a gaseous mixture comprising said olefin and molecular oxygen into contact with the catalyst at a predetermined pressure, temperature, and composition of the gaseous mixture, whereby the olefin is oxidized to a product of partial oxidation, the conditions of operation being conducive to deactivation of the cuprous oxide catalyst, separating from the catalyst a gaseous mixture comprising the product of partial oxidation, when appreciable deactivation of the catalyst has occurred and the catalyst is still free of material deposits of carbonaceous, tarry and like material, deliberately changing for a brief period of time at least one of the conditions of the temperature and the pressure, by an amount such that the ratio $$(T_1/T_0)^2/(P_1/P_0)^{1/3}$$

has a value of 1.1 to 4.0 when there is substituted for $T_0$ and $T_1$ the temperature, in degrees centigrade, before and after the change, respectively, and there is substituted for $P_0$ and $P_1$, the pressure in pounds per square inch absolute, before and after the change, respectively, while maintaining the reaction conditions including the temperature and the composition of the said gaseous mixture comprising oxygen and olefin which is brought into contact with the catalyst otherwise substantially unchanged, and after each period restoring the reaction conditions substantially to those obtaining in the interval prior to the change.

4. In a continuous process for the oxidation of propylene to acrolein by reaction with molecular oxygen in the presence of a solid catalyst essentially comprising cuprous oxide under conditions of operation conducive to gradual deactivation of the catalyst, the steps of passing a continuous stream of a gaseous mixture comprising propylene and oxygen into contact with a mobile bed of solid catalyst essentially comprising cuprous oxide maintained in a first reaction zone, thereby forming acrolein by oxidation of the propylene, continuously withdrawing partially deactivated catalyst which is free of material deposits of carbonaceous, tarry and like material from the reaction zone and conveying it to a second zone maintained at a pressure below the pressure existing in said reaction zone by an amount such that the ratio $$(T_1/T_0)^2/(P_1/P_0)^{1/3}$$

has a value of 1.1 to 4.0 when there is substituted for $T_0$ and $T_1$ the temperature, in degrees centigrade, of said first and of said second reaction zones, respectively, and there is substituted for $P_0$ and $P_1$ the pressures, in pounds per square inch absolute in said first and in said second reaction zones, respectively, therein passing a separate continuous stream of gaseous mixture comprising propylene and oxygen in substantially the same proportions as in the gaseous mixture employed in the first reaction zone into contact with the catalyst whereby activity of the catalyst is restored and an amount of the propylene in said separate stream is oxidized to acrolein, continuously returning reactivated catalyst from said second zone to said reaction zone, combining the effluents from the respective zones, and recovering acrolein from the combined effluents.

5. In a continuous process for the oxidation of propylene to acrolein by reaction with molecular oxygen in the presence of a solid catalyst essentially comprising cuprous oxide under conditions of operation conducive to gradual deactivation of the catalyst, the steps of passing a continuous stream of a gaseous mixture comprising propylene and oxygen into contact with a mobile bed of solid catalyst essentially comprising cuprous oxide maintained in a first reaction zone, thereby forming acrolein by oxidation of the propylene, continuously withdrawing partially deactivated catalyst which is free of material deposits of carbonaceous, tarry and like material from the reaction zone and conveying it to a second zone maintained at a temperature above the temperature existing in said reaction zone by an amount such that the ratio $$(T_1/T_0)^2/(P_1/P_0)^{1/3}$$

has a value of 1.1 to 4.0 when there is substituted for $T_0$ and $T_1$ the temperature, in degrees centigrade, of said first and of said second reaction zones, respectively, and there is substituted for $P_0$ and $P_1$ the pressures, in pounds per square inch absolute, in said first and in said second reaction zones, respectively, therein, passing a separate continuous stream of a gaseous mixture comprising propylene and oxygen in substantially the same proportions as in the gaseous mixture employed in the first reaction zone into contact with the catalyst whereby activity of the catalyst is restored and an amount of the propylene in said separate stream is oxidized to acrolein, continuously returning reactivated catalyst from said second zone to said reaction zone, combining the effluents from the respective zones, and recovering acrolein from the combined effluents.

6. In a process for the oxidation of an olefin containing at least three carbon atoms to a product of partial oxidation by reaction with molecular oxygen in the presence of a mobile bed of a solid catalyst essentially comprising cuprous oxide, wherein a gaseous mixture comprising said olefin and molecular oxygen is passed into contact with the catalyst in a first reaction zone maintained under conditions of operation conducive to gradual deactivation of the catalyst, the method of maintaining, or restoring high activity of the catalyst which comprises transferring partially deactivated catalyst which is free of material deposits of carbonaceous, tarry and like material from said reaction zone to a second reaction zone, therein passing a gaseous mixture comprising said olefin and oxygen into contact with the catalyst at conditions of at least one of: temperature and pressure, differing from those in the first reaction zone by an amount represented by a value of 1.1 to 4.0 for the ratio $$(T_1/T_0)^2/(P_1/P_0)^{1/3}$$

when there is substituted for $T_0$ and $T_1$ the temperature, in degrees centigrade, of said first and second reaction zones, respectively, and there is substituted for $P_0$ and $P_1$ the pressures, in pounds per square inch absolute, in said first and second reaction zones, respectively, maintaining the catalyst in said second reaction zone until reactivation has occurred, and then transferring the catalyst to the first-mentioned reaction zone.

7. In a continuous process for oxidizing an olefin containing at least three carbon atoms to an unsaturated carbonylic compound of the group consisting of the unsaturated aldehydes and the unsaturated ketones by passing a stream of a gaseous mixture comprising an olefin containing at least three carbon atoms and oxygen into contact with a solid catalyst essentially comprising cuprous oxide under predetermined operating conditions, said predetermined conditions including a superatmospheric pressure of from about 3 to about 15 atmospheres and being conducive to deactivation of the cuprous oxide catalyst, the improvement, whereby high overall activity of the catalyst is obtained, which comprises periodically and briefly deliberately subjecting the catalyst which is free of material deposits of carbonaceous, tarry and like material to operating conditions in the process different from said predetermined operating conditions at least by a higher temperature such that the ratio $$(T_1/T_0)^2/(P_1/P_0)^{1/3}$$

has a value of 1.1 to 4.0 when there is substituted for $T_0$ and for $P_0$ the temperature in degrees centigrade and the pressure in pounds per square inch absolute, respectively, at said predetermined operating conditions and for $T_1$ and for $P_1$ the temperature in degrees centigrade and the pressure in pounds per square inch absolute, respectively, for said second-mentioned operating conditions, the composition of the gaseous mixture which is brought into contact with the catalyst under the second set of operating conditions being substantially unchanged from what it was in the first set of operating conditions, and after each period of operation at said higher temperature deliberately substantially restoring said predetermined operating conditions.

8. Process according to claim 7 when the olefin is propylene and the unsaturated carbonylic compound is acrolein.

9. In a continuous process for oxidizing an olefin containing at least three carbon atoms to an unsaturated carbonylic compound of the group consisting of the unsaturated aldehydes and the unsaturated ketones by passing a stream of a gaseous mixture comprising an olefin containing at least three carbon atoms and oxygen into contact with a solid catalyst essentially comprising cuprous oxide under predetermined operating conditions, said predetermined conditions including a superatmospheric pressure of from about 3 to about 15 atmospheres and being conducive to deactivation of the cuprous oxide catalyst, the improvement, whereby high overall activity of the catalyst is obtained, which comprises periodically and briefly deliberately subjecting the catalyst which is free of material deposits of carbonaceous, tarry and like material to operating conditions in the process different from said predetermined operating conditions at least by a lower pressure such that the ratio $$(T_1/T_0)^2/(P_1/P_0)^{1/3}$$

has a value of 1.1 to 4.0 when there is substituted for $T_0$ and for $P_0$ the temperature in degrees centigrade and the pressure in pounds per square inch absolute, respectively, at said predetermined operating conditions and for $T_1$ and for $P_1$ the temperature in degrees centigrade and the pressure in pounds per square inch absolute, the composition of the gaseous mixture which is brought into contact with the catalyst under the second set of operating conditions being substantially unchanged from what it was in the first set of operating conditions, and after each period of operation at said lower pressure deliberately substantially restoring said predetermined operating conditions.

10. Process according to claim 9 when the olefin is propylene and the unsaturated carbonylic compound is acrolein.

11. In a continuous process for oxidizing an olefin containing at least three carbon atoms to a product of partial oxidation by passing a gaseous mixture comprising said olefin and oxygen into contact with a solid catalyst essentially comprising cuprous oxide under predetermined operating conditions, said predetermined operating conditions being conducive to deactivation of the catalyst, the improvement, whereby high overall activity of the catalyst is obtained, which comprises deliberately subjecting the at least appreciably deactivated catalyst which is free of material deposits of carbonaceous, tarry and like material to operating conditions in the process different from said predetermined operating conditions by at least one of the temperatures and the pressures, such that the ratio $$(T_1/T_0)^2/(P_1/P_0)^{1/3}$$

has a value of 1.1 to 4.0 when there is substituted for $T_0$ and for $P_0$ the temperature in degrees centigrade and the pressure in pounds per square inch absolute, respectively, at said predetermined operating conditions and for $T_1$ and for $P_1$ the temperature in degrees centigrade and the pressure in pounds per square inch absolute, the composition of the gaseous mixture which is brought into contact with the catalyst under the second set of operating conditions being substantially unchanged from what it was in the first set of operating conditions, and maintaining the catalyst under said second-mentioned operating conditions until reactivation has occurred.

KENNETH D. DETLING.
THURSTON SKEI.

References Cited in the file of this patent

UNITED STATES PATENTS

| Number | Name | Date |
|---|---|---|
| 2,307,434 | Veltman | Jan. 5, 1943 |
| 2,451,485 | Hearne et al. | Oct. 19, 1948 |